(12) United States Patent
Islam et al.

(10) Patent No.: US 11,157,457 B2
(45) Date of Patent: *Oct. 26, 2021

(54) FILE MANAGEMENT IN THIN PROVISIONING STORAGE ENVIRONMENTS

(71) Applicant: International Business Machines Corporation, Armonk, NY (US)

(72) Inventors: Shah M. R. Islam, Tucson, AZ (US); John T. Olson, Tucson, AZ (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 16/697,239

(22) Filed: Nov. 27, 2019

(65) Prior Publication Data

US 2020/0097449 A1 Mar. 26, 2020

Related U.S. Application Data

(63) Continuation of application No. 15/809,571, filed on Nov. 10, 2017, now Pat. No. 10,528,527, which is a
(Continued)

(51) Int. Cl.
*G06F 16/178* (2019.01)
*G06F 16/172* (2019.01)

(52) U.S. Cl.
CPC .......... *G06F 16/178* (2019.01); *G06F 16/172* (2019.01)

(58) Field of Classification Search
None
See application file for complete search history.

(56) References Cited

U.S. PATENT DOCUMENTS

| 5,909,689 A | 6/1999 | Van Ryzin |
| 6,338,149 B1 | 1/2002 | Ciccone, Jr. et al. |

(Continued)

OTHER PUBLICATIONS

Nelaaro et al., What is the data transfer speeds within the disk, to other devices? Feb. 25, 2011, superuser.com, https://superuser.com/questions/250142/what-is-the-data-transfer-speeds-within-the-disk-to-other-devices.*

(Continued)

*Primary Examiner* — Jason G Liao
(74) *Attorney, Agent, or Firm* — Scott S. Dobson

(57) ABSTRACT

A computing environment includes a home site and a cache site with nonhomogeneous thin-provisioned storage configurations. A file management system updates files stored at the cache site. Each updated file has an updated file size and a pre-update file size. When a resynchronization is needed between the cache site and the home site, for example due to an extended communication failure, the storage requirement changes for the updated files are calculated and a notification is sent to the home site. The notification identifies the updated files and the storage requirement changes. The home site sends a reply to the cache site. The reply identifies which files are approved for immediate processing. The cache site transfers resynchronization data for the approved files to the home site, and delays transferring resynchronization data for the unapproved files until subsequent replies from the home site indicate that the previously unapproved files are now approved.

20 Claims, 5 Drawing Sheets

Related U.S. Application Data continuation of application No. 14/459,510, filed on Aug. 14, 2014, now Pat. No. 9,881,018.

(56) References Cited

U.S. PATENT DOCUMENTS

| | | | |
|---|---|---|---|
| 7,263,578 | B2 | 8/2007 | Kano |
| 7,555,559 | B2 | 6/2009 | Chapweske |
| 7,949,847 | B2 | 5/2011 | Murase |
| 8,166,241 | B2 | 4/2012 | Sugimoto et al. |
| 9,881,018 | B2 | 1/2018 | Islam et al. |
| 2003/0005306 | A1 | 1/2003 | Hunt et al. |
| 2005/0262377 | A1 | 11/2005 | Sim-Tang |
| 2006/0242378 | A1 | 10/2006 | Kano |
| 2009/0240809 | A1 | 9/2009 | La Frese et al. |
| 2010/0262802 | A1 | 10/2010 | Goebel et al. |
| 2011/0208931 | A1 | 8/2011 | Pendharkar et al. |
| 2012/0054438 | A1 | 3/2012 | Kawaguchi |
| 2013/0339407 | A1 | 12/2013 | Sharpe et al. |
| 2018/0067963 | A1 | 3/2018 | Islam et al. |

OTHER PUBLICATIONS

Data Sheet Barracude, "The Power of One," Nov. 2011 Seagate Technology LLC, http://www.seagate.com/staticfiles/docs/pdf/datasheet/disc/barracuda-ds1737-1-1111us.pdf.

Dell Latitude D400 2004, Dell Inc., http://www.dell.com/downloads/us/products/latit/d400_spec.pdf.

Dufrasne, B. et al., "DS8000 Thin Provisioning," International Technical Support Organization, Oct. 2009, www.bm.com/redbooks, REDP-4554-00.

Eli the Computer Guy, "Manage Storage Spaces and Storage Pools in Windows Server 2012," May 30, 2013, youtube.com, https://www.youtube.com/watch?v=F1VolftDMs.

Harris, "What is Cloud Storage?" Oct. 7, 2016, lifewire.com, https://www.lifewire.com/what-is-cloud-storage-2438541.

List of IBM Patents or Patent Applications Treated as Related, Nov. 26, 2019, 2 pgs.

Rouse, "Definition Cloud Storage," May 16, WhatIs.com, http://searchcloudstorage.techtarget.com/definition/cloud-storage.

Sheth et al., "Federated Database Systems for Managing Distributed, Heterogeneous, and Autonomous Databases," Sep. 1990, ACM Computing Surveys, vol. 22, No. 3, pp. 183-236.

Strickland, "How Cloud Storage Works," Apr. 30, 2008, howstuffworks.com, http://computer.howstuffworks.com/cloud-computing/cloud-storage.htm.

Wikipedia, "Inode," http://en/wikipedia.org/wiki/Inode, last modified Jan. 25, 2014, accessed Feb. 19, 2014.

Dell Latitude D600 2003, Dell Inc., http://www.dell.com/downloads/global/products/latit/en/spec_latit_d600_en.pdf.

* cited by examiner

FILE MANAGEMENT IN THIN PROVISIONING STORAGE ENVIRONMENTS

BACKGROUND

The present disclosure relates to file management in thin provisioning storage environments, and more specifically relates to resynchronizing files between a cache site and home site, including where the storage configurations at the home site and at the cache site are nonhomogeneous.

Thin provisioning storage environments use virtualization to give the appearance of having available a greater amount of physical storage than is actually available. In a shared storage environment, thin provisioning allows for efficient utilization of physical storage resources. Thin provisioning allocates physical blocks of storage to an application as the blocks are actually used rather than as the blocks are reserved. A thin-provisioned device maintains a list of virtual storage blocks allocated to the application, but assigns a physical block to the virtual block only when a write operation is performed. Typical thin-provisioned devices will warn an administrator when the amount of available storage drops below a specified threshold. The administrator can then take action in response to the warning, such as allocating a new storage device or relocating data from the warning device to a different storage device.

SUMMARY

Disclosed herein are embodiments of a method, computer program product, and computer system for managing files in a computing environment. The computing environment includes a home site and a cache site. The home site and the cache site have non-homogeneous storage configurations, and the home site has at least one thin-provisioned storage device. The system updates files stored at the cache site. Each updated file has an updated file size and a pre-update file size. The system determines to perform a resynchronization of the updated files between the cache site and the home site. The system calculates the storage requirement changes for the updated files. The calculation is based at least in part on comparing the updated file sizes to the pre-update file sizes.

A notification is sent to the home site. The notification includes the storage requirement changes. A reply is received from the home site in response to the notification. The reply identifies at least one approved file and at least one disapproved file from the updated files. Resynchronization data associated with approved files is transferred to the home site in response to the reply. Transfer of resynchronization data associated with disapproved files is delayed in response to the reply. In some embodiments, at least one subsequent reply is received from the home site in response to the notification, and the resynchronization data associated with the previously disapproved files is transferred to the home site in response to the at least one subsequent reply.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
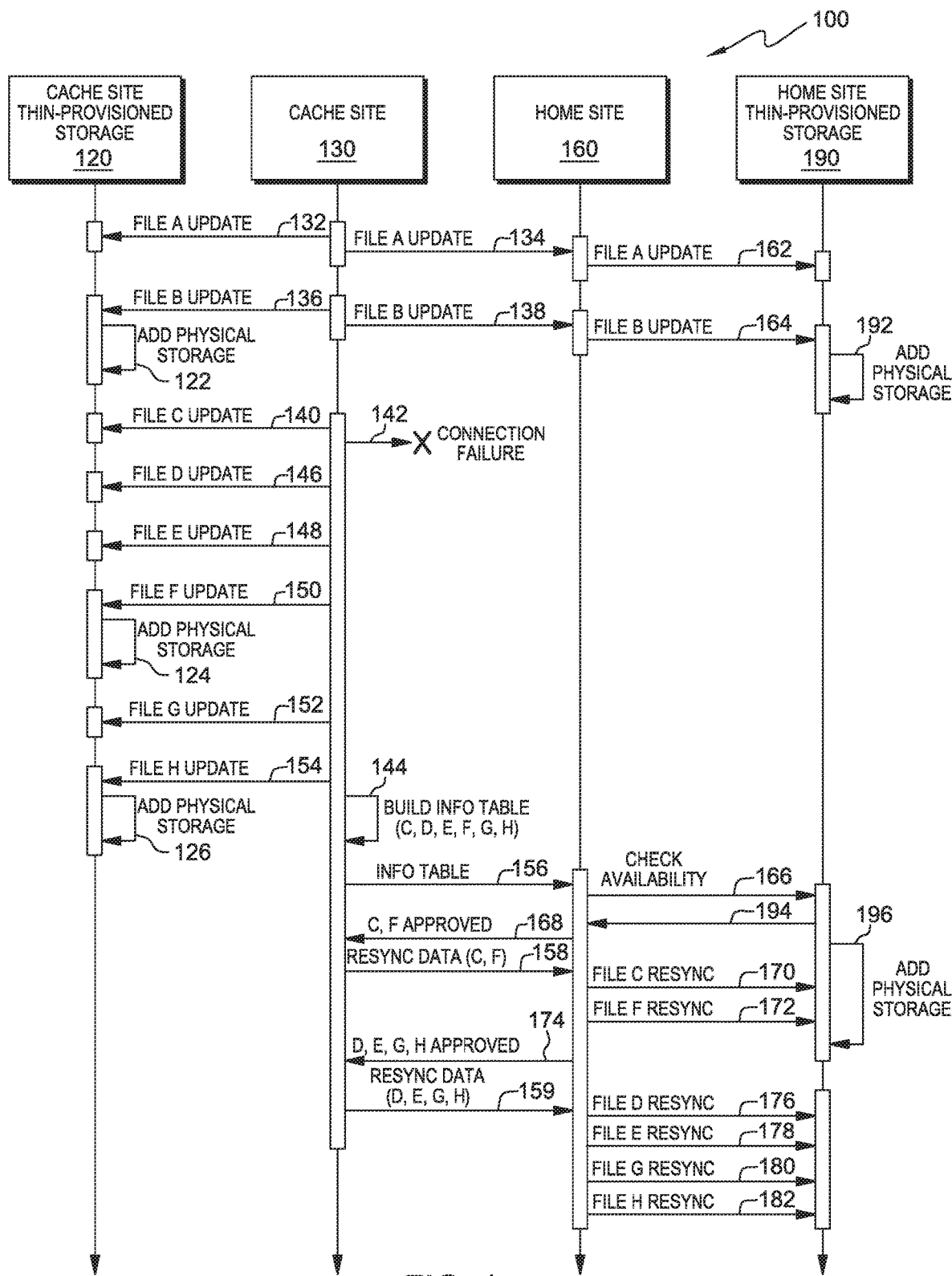
FIG. 1 is a high-level sequence diagram illustrating an example process environment for resynchronizing files between a cache site and a home site.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to file management in thin provisioning storage environments. More particular aspects relate to resynchronizing files between a cache site and a home site, including where the storage configurations at the home site and at the cache site are non-homogeneous. While the present disclosure is not necessarily limited to such applications, various aspects of the disclosure may be appreciated through a discussion of various examples using this context.

As used herein, a home site is a source of original data for client applications. Depending on the type of client applications associated with the home site, the home site may utilize a simple file management system or a complex file management system. For example, a home site for operational analytics, digital media, or other big data applications may utilize a high-performance enterprise file management platform that uses a clustered file system with multiple file servers and multiple storage controllers to provide higher reliability.

In some file management systems, a cache site may be used in conjunction with a home site. Whenever an application first accesses a file, the file is fetched from the home site and copied to the cache site. Subsequent accesses of the file are then served from the cache site, which typically provides faster access times than the home site. The file management system ensures that any updates made to files at the cache site are propagated to the home site, so that the data on the home site and on the cache site remain synchronized. Providing persistent data storage at the cache site can provide additional benefits, such as allowing applications to continue to access and modify previously cached data even when the home site is temporarily unavailable. For example, if the home site and cache site communicate over a wide area network, providing persistent data storage at the cache site can mask wide area network latencies and outages.

A cache site that is disconnected from the home site, for example due to network failure, may continue to serve files previously cached if these cached files are stored in the cache site's persistent store. Write operations performed at the cache site may then be queued in memory. When connectivity resumes between the cache site and the home site, the queued write operations may then be performed at the home site to achieve data synchronization.

Occasionally, a catastrophic event may prevent the file management system from updating the home site using only the queued write operations from the cache site. For example, the home site files may have become corrupted, or a long-term network outage may have caused a write queue at the cache site to overflow its allocated memory. One solution to such an event is for the file management system to perform a resynchronization between the cache site and the home site for the files stored in the cache site's persistent store. During a resynchronization, the file management system may copy entire files from the cache site to the home site, completely replacing the home site copies. Such a resynchronization typically involves much larger data transfers between the cache site and the home site than the data transfers that occur during a home site update using the queued write operations.

When the storage server at the home site uses thin provisioning, an issue can arise when the file management system performs a resynchronization. Thin provisioning storage environments use virtualization to give the appearance of having available a greater amount of physical storage than is actually available. If the updated files at the cache site have higher storage requirements than the pre-update files at the home site, then the home site thin-provisioned storage server may have insufficient time to assign enough physical storage to accommodate the larger files, causing the home site to experience a failure. To avoid such a home site failure caused by data overload from a cache site, the cache site may first alert the home site to changes in storage requirements related to the updated files that it needs to send. The home site may then (1) reply to the cache site, indicating which files, if any, that the home site can accommodate immediately, (2) assign additional physical storage at the home site to accommodate the remaining files, and (3) receive the remaining files when the additional physical storage is available.

FIG. 1 is a high-level sequence diagram illustrating an example process environment 100 for resynchronizing files between a cache site 130 and a home site 160 after a communication failure 142. A file management system deployed on the home site 160 communicates, for example across a wide area network, with a file management system deployed on the cache site 130. Home site thin-provisioned storage 190 represents the storage managers, storage pools, storage devices, and other storage entities accessed by the home site file management system 160. Cache site thin-provisioned storage 120 represents the storage managers, storage pools, storage devices, and other storage entities accessed by the cache site file management system 130. The storage configurations at the cache site and at the home site may be nonhomogeneous; for example, home site thin-provisioned storage 190 may include a different type, size, and number of storage devices than cache site thin-provisioned storage 120.

When File A, File B, File C, File D, File E, File F, File G, and File H are first accessed, those files are copied from the home site 160 to the cache site 130. A client application writes to File A, causing the cache site to update its stored copy of File A 132. The thin-provisioned storage 120 at the cache site has enough physical storage resources available to accommodate the File A update. The cache site subsequently communicates the File A update to the home site 134. When the home site receives the update for File A, the home site updates its stored copy of File A 162. The thin-provisioned storage 190 at the home site also has enough physical storage resources available to accommodate the File A update.

A client application then writes to File B, causing the cache site to update its stored copy of File B 136 and communicate the File B update to the home site 138. But this time, although the thin-provisioned storage 120 at the cache site has enough virtual storage resources available to accommodate the File B update, it does not have enough physical storage resources allocated, so additional physical storage resources are added 122. When the home site receives the update for File B, the home site updates its stored copy of File B 164. Again, although the thin-provisioned storage 190 at the home site has enough virtual storage resources available to accommodate the File B update, it does not have enough physical storage resources allocated, so additional physical storage resources are added 192. Because the cache site has been able to regularly propagate file updates to the home site, the thin-provisioned storage 190 at the home site has been able to keep up with the cache site and adequately provide the necessary physical storage resources, and File A and File B remain synchronized at the home site 160 and cache site 130.

A client application then writes to File C, causing the cache site to update its stored copy of File C 140. The thin-provisioned storage 120 at the cache site has enough physical storage resources available to accommodate the File C update. But when the cache site subsequently attempts to communicate the File C update to the home site 142, the connection has failed and the home site cannot be reached. Applications continue to access cached files during the disconnection, causing the cache site to update its stored copies of File D 146, File E 148, File F 150, File G 152, and File H 154. In this example process environment 100, thin-provisioned storage capacity thresholds were reached after the File F update 150 and after the File H update 154, so additional physical storage resources were added 124, 126.

When communication with the home site 160 is restored, the cache site 130 may determine that a resynchronization is needed for Files C, D, E, F, G, and H. Rather than send all the resynchronization data for all the files at once, the cache site 130 calculates the storage requirement changes for Files C, D, E, F, G, and H; places the calculated information in an information table 144; and sends the information table to the home site 156. The home site may consult its thin-provisioned storage 166, 194 to determine which, if any, file resynchronizations can be immediately accommodated. In this example process environment 100, the home site determines that its thin-provisioned storage 190 has adequate physical resources allocated to accommodate File C and File F, but cannot accommodate File D, File E, File G, and File H. The home site 160 therefore replies to the cache site 130 that only File C and File F are approved for immediate resynchronization 168, and additional physical storage resources are added 196 to accommodate the remaining files. Without having to wait for the additional physical storage, the cache site may send the resynchronization data for File C and File F 158, the home site may overwrite File C 170 and may overwrite File F 172, and File C and File F are again synchronized at the home site 160 and the cache site 130.

After the additional physical resources are added 196, the home site may notify the cache site that the remaining (previously unapproved) files are now approved for resynchronization 174. The cache site may then send the resynchronization data for Files D, E, G, and H 159; the home site may overwrite File D 176, may overwrite File E 178, may overwrite File G 180, and may overwrite File H 182; and File D, File E, File G, and File H are again synchronized at the home site 160 and the cache site 130.

Figure 2:
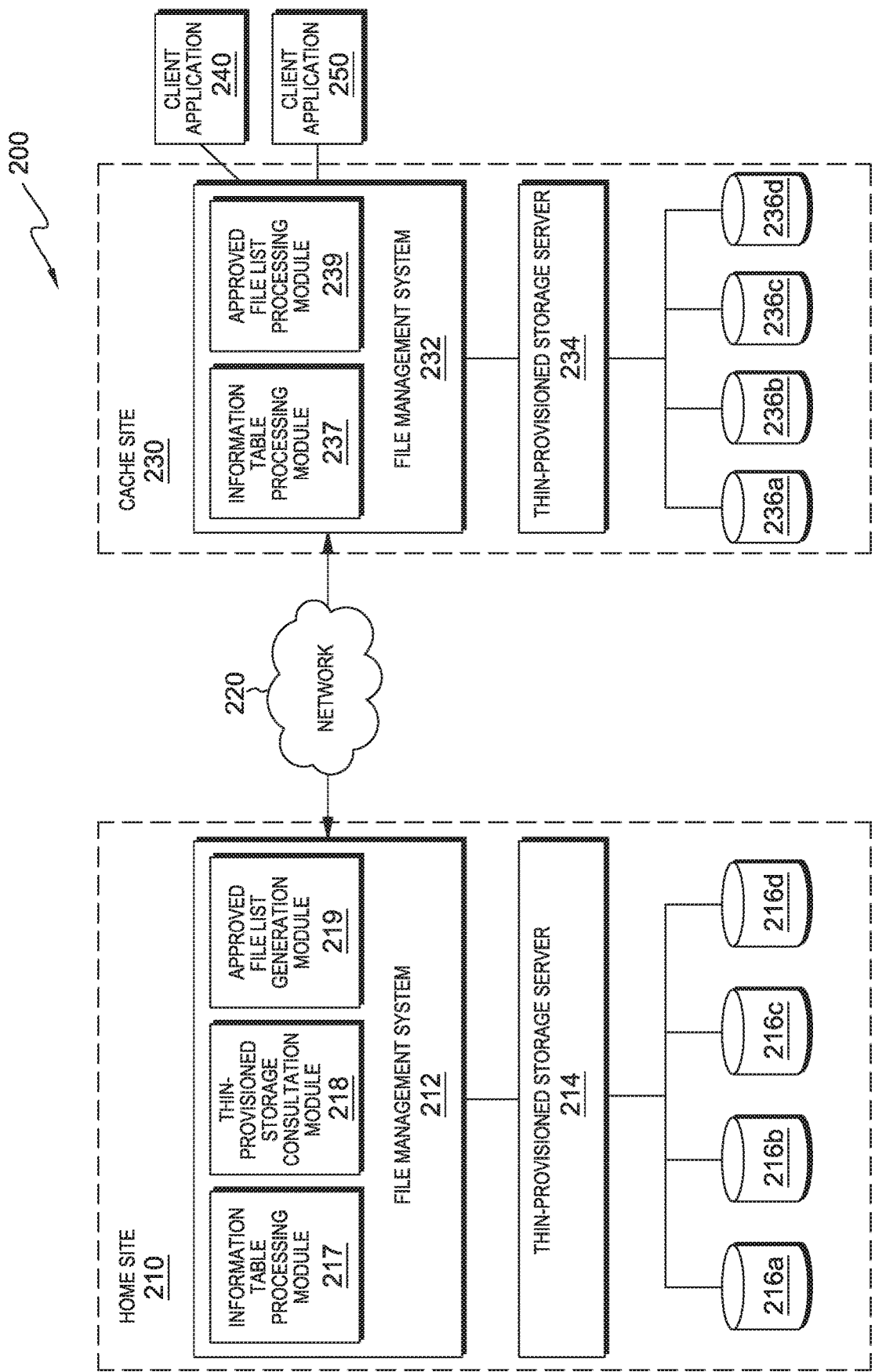
FIG. 2 is a high-level block diagram illustrating an example computing system for resynchronizing files between a cache site and a home site.

FIG. 2 is a high-level block diagram illustrating an example computing system 200 for resynchronizing files between a cache site 230 and a home site 210 after a communication failure between the two sites. A file management system 212, 232 manages the data in system 200. The file management system may be a clustered file system, and may be able to store and forward large amounts of file-based data quickly, reliably, and efficiently. The file management system may safely support high performance data and may offer consistent access to a common set of data from multiple servers. The file management system may bring together the power of multiple file servers and multiple storage controllers to provide high reliability and to outperform single file server solutions.

Cloud computing solutions provide large-scale and seamless access to vast quantities of data across the globe; however, client applications 240, 250 may demand the reliability, consistency, and performance of a traditional cluster file system regardless of the physical distance between data centers. The file management system at the cache site 232 may therefore include a scalable, high-performance, clustered file system cache that provides for parallel data-intensive applications 240, 250 that require wide-area file access. The home site 210 and the cache site 230 may communicate over wide-area network (WAN) 220.

The cache site 230 may cache the original data from the home site locally in a persistent store for client applications 240, 250. The first time that the client applications 240, 250 try to access the original data, the files may be fetched from the home site 210 and copied to the file management system 232 at the cache site 230. Subsequent requests for the files may then be served from the cache site 230, eliminating the need for WAN 220 bandwidth. The file management system 232 at the cache site 230 may ensure that files at the cache site 230 stay in synchronization with the files at the home site 210. File data may be transferred using a protocol where the home site 210 acts as a Network File System (NFS) server and the cache site 230 acts as an NFS client. The file management system 212 at the home site 210 may store file data on the storage devices 216 managed by the storage server 214. The file management system 232 at the cache site 230 may store file data on the storage devices 236 managed by the storage server 234. The file management system 212, 232 may logically group files together in a fileset. At the cache site 230, the file management system 232 may assign a gateway node to each fileset. The gateway node may be responsible for communicating with the home site 210 regarding its associated fileset.

The file management system at the cache site 230 may be configurable. For example, the system may be configurable for read-only mode or for single writer mode. In single writer mode, the cache site 230 can perform write operations on files after fetching the files from the home site 210, but the home site 210 is prevented from performing write operations to the cached files. The cache site 210 writes to files in the local persistent store 236 and these write operations are then performed asynchronously at the home site 210.

A benefit of having persistent storage at the cache site 230 is that applications may still run even if the home site 210 is disconnected from the cache site 230 due to network 220 failure or for other reasons. When the cache site 230 is unable to communicate with the home site 210, the file management system 232 may be in "disconnected mode". In disconnected mode, the cache site 230 can continue to serve files already cached since these files are stored in its persistent store 236. Write operations of both data and metadata may be performed locally and queued in memory queues on the gateway node of the fileset to which the written file belongs. When the cache site 230 is reconnected to the home site 210, the gateway nodes execute the queued write operations on the home site 210.

One or both of the storage servers 214, 234 may be thin-provisioned. Thin provisioning uses virtualization technology to give the appearance of having more physical storage resources than are actually available. A thin-provisioned storage server relies on on-demand allocation of physical data blocks rather than the traditional method of allocating all the blocks up front. Because applications tend to reserve storage for worst-case scenarios while actively using less than all reserved storage most of the time, thin provisioning provides a method for optimizing utilization of shared storage.

A thin-provisioned device may have a repository capacity threshold specifying a minimum percentage of available physical capacity. If the free space on a device drops below this threshold value, an administrator may be notified and expected to take appropriate action. For example, an administrator may allocate additional physical storage or may relocate data to another device to free up physical storage.

A problem may arise when the cache site 230 is in disconnected mode for a long time, or when the files at the home site 210 become corrupted. When the cache site is in disconnected mode for a long time, preventing the gateway nodes from executing operations at the home site 210, the memory queues may overflow. When the problem is resolved and communication between the cache site 230 and the home site 210 is restored, a resynchronization may be immediately executed with no consideration of whether the home site 210 is thin-provisioned. The home site administrator may therefore have insufficient time to take action if free space drops below the threshold during the resynchronization.

To avoid this problem, the resynchronization mechanism may be made aware of the thin provisioning storage environment. At the start of the resynchronization, data files may be ordered and selected based on the amount of new allocations resulting from the updates to the files at the cache site 230 and the availability of new allocation space in the associated thin-provisioned storage 216 at the home site 210. An information table generation module 237 at the cache site may calculate the storage requirement changes for the updated data files and send this information to the home site 210. An information table processing module 217 at the home site may process the storage requirement changes and, together with a thin-provisioned storage consultation module 218, determine which updated files can be immediately accommodated. An approved file list generation module 219 at the home site may send a list of the approved files back to the cache site. An approved file list processing module 239 at the cache site may then send the approved file data back to the home site. If necessary, the approved file list generation module 219 may send multiple replies to the cache site as new storage is provisioned until all updated files have been processed. In this way, data is transferred from the cache site 230 to the home site 210 only after the home site 210 verifies that the associated local storage pool has sufficient space to accommodate the new allocations.

Figure 3:
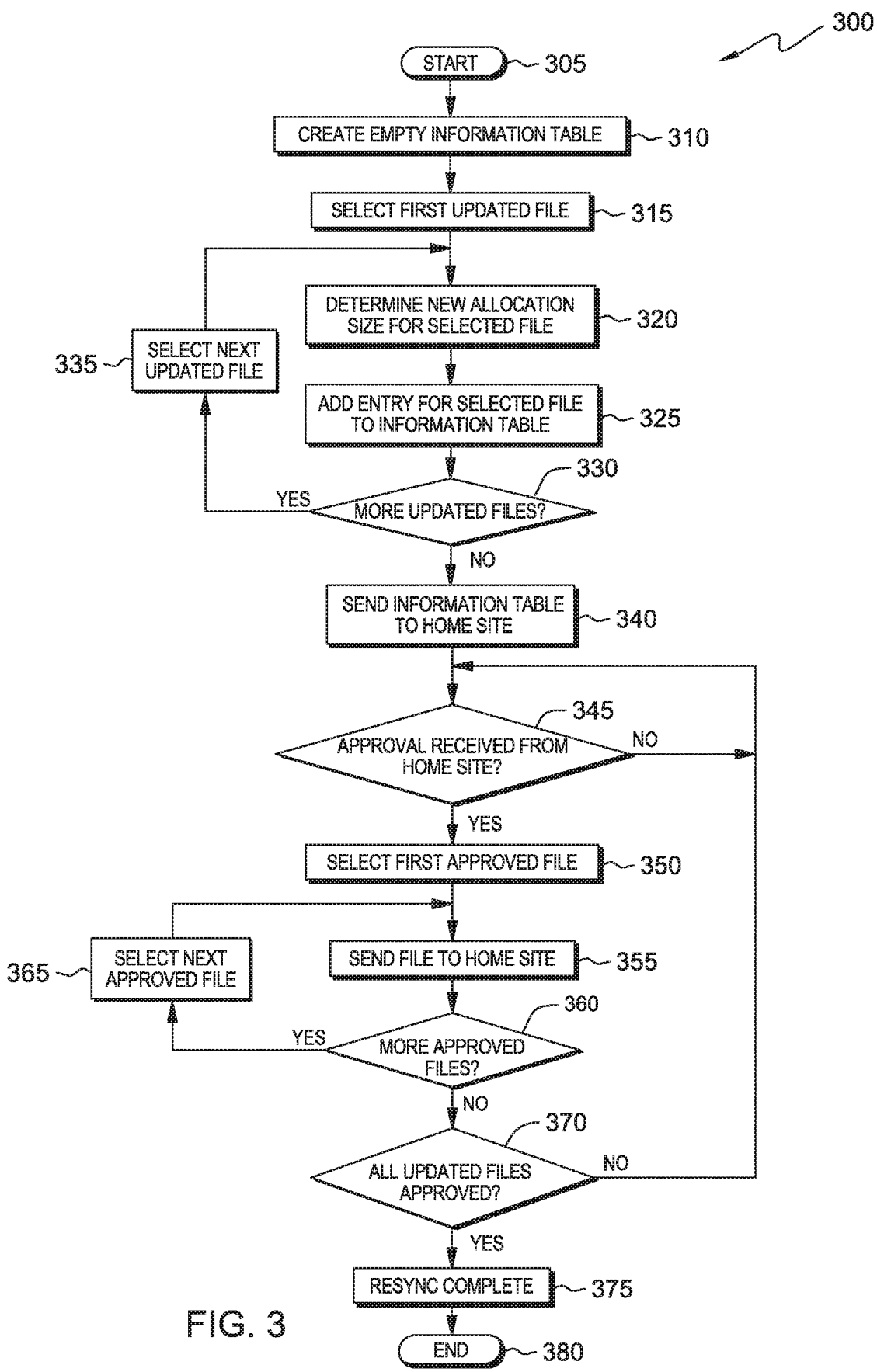
FIG. 3 is a flow diagram illustrating an example method for a cache site resynchronizing files with a home site.

FIG. 3 is a flow diagram illustrating an example method 300 for a cache site resynchronizing files with a home site.

From start 305, the file management system at the cache site may create an empty information table at 310. The information table contains the storage requirements for the files that will be resynchronized. The file management system at the cache site may then select a "dirty" file at 315. Dirty files are files that have been updated since the last time the files were synchronized with the home site. In some embodiments, a bit is set on the inode of a file to indicate that the file is dirty. The inode is a data structure that describes the attributes of a file. Every file may have a unique inode that contains the information necessary for a process to access the file. A file at the cache site may be mapped to the file with the same name on the home site, and the cache site may maintain this information as part of a metadata field of the inode. The cache site may store the inode of a file at the home site as a remote inode at the cache site, and may store additional status bits for the file at the cache site, such as a dirty bit. After a catastrophic event, such as a long-term communication failure, the cache site may perform a scan of all file inodes to identify which files are dirty and therefore in need of resynchronization with the home site. In some embodiments, the cache site file management system may create a table containing the file identifiers and updated file sizes of all dirty files identified during the inode scan.

After a dirty (updated) file is selected at 315, the cache site may determine a new allocation size for the selected file at 320. In some embodiments, the new allocation size is the difference between the size of the file when it was last clean (pre-update) and the current size of the dirty file, for example, newAllocationSize=CacheFileSize−HomeFileSize. An entry for the selected file may then be added to the information table at 325. In some embodiments, the entry may be in the form of tuple (dirtyFileID, newAllocationSize). If there are more dirty files remaining to be processed at 330, then the next dirty file may be selected at 335, and the process may repeat until the information table contains an entry for each dirty file. The information table is then sent from the cache site to the home site at 340, thus notifying the home site of the files included in the resynchronization and the storage requirement changes for the files.

The cache site then waits for a reply identifying the approved files from the home site at 345. When such a reply is received, the cache site may select the first approved file indicated in the reply at 350 and may send the entire file to the home site at 355. If there are more approved files indicated in the reply at 360, then the next approved file may be selected at 365. The process of sending approved files to the home site may be repeated until all approved files in the reply have been processed. The cache site may keep track of which files from the information table have been approved, and if there are still some files which have not yet been approved by the home site at 370, the cache site waits for a subsequent reply from the home site at 345. When all files targeted for resynchronization have been sent to the home site, the resynchronization is complete at 375 and the method ends at 380.

Figure 4:
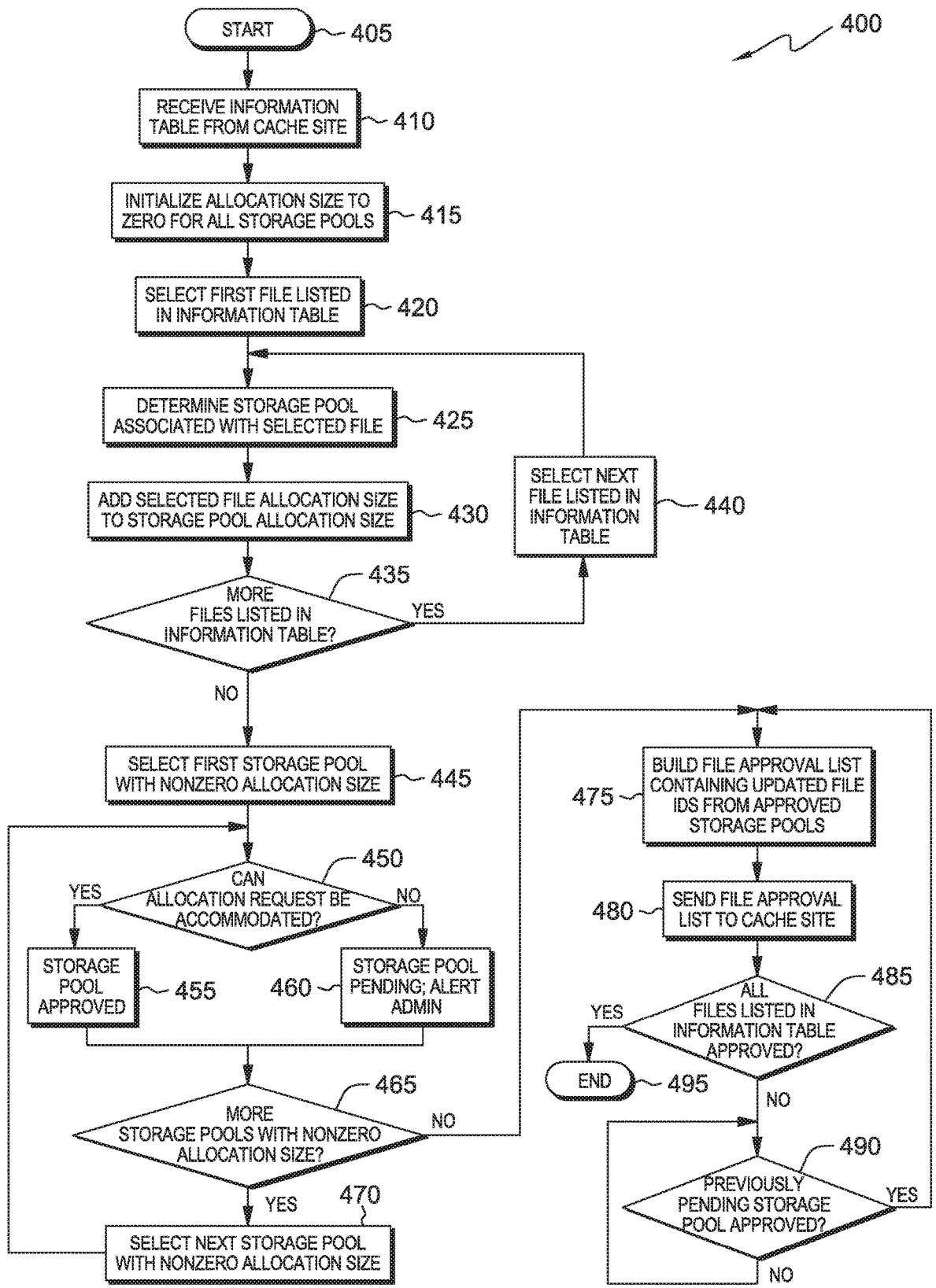
FIG. 4 is a flow diagram illustrating an example method for a home site resynchronizing files with a cache site.

FIG. 4 is a flow diagram illustrating an example method 400 for a home site resynchronizing files with a cache site. From start 405, the file management system at the home site may receive the information table from the cache site at 410. The information table contains the storage requirements for the files that will be resynchronized. At 415, the home site may initialize an allocation size to zero for all storage pools at the home site that are associated with files listed in the information table. For example, the home site may maintain a list of storage pools, where each entry in the list may be in the form of tuple (StoragePoolID, allocationRequirement, existingSize), and may set allocationRequirement=0 for all entries.

The file management system at the home site may select a file identified in the information table at 420. At 425, the home site determines which storage pool is associated with the selected file, and at 430 adds the new allocation size of the selected file, which is determined from the information table, to the allocation size for its associated storage pool. In some embodiments, if the new allocation size in the information table is the difference between the size of the file when it was last clean (pre-update) and the current size of the dirty file at the cache site, the home site may calculate the new allocation size of the selected file by adding the new allocation size to the pre-update file size for the selected file. In such embodiments, the allocation size for the storage pool of the selected file may be adjusted using $$\text{allocationRequirement}=\text{allocationRequirement}+\text{newAllocationSize}+\text{existingFileSize}.$$

If there are more files remaining to be processed in the information table at 435, then the next file may be selected at 440, and the storage pool allocation size for the storage pool associated with the file is adjusted based on the file size data provided for the file in the information table. When all entries in the information table have been processed, the home site may then have a list of its storage pools and how the size of the storage pools will be affected by the files that are identified in the information table. The home site can then determine which storage pools will be able to accommodate the files identified in the information table and which storage pools will need to have additional physical storage.

At 445, the home site may select a storage pool at 445 and determine whether the selected storage pool can accommodate the file transfers as specified in the information table at 450. The selected storage pool is either approved at 455 or not approved at 460. Storage pools that are not approved will require some time to get additional physical resources before the file transfers specified in the information table can be accommodated. If more storage pools remain to be processed at 465, the next storage pool is selected at 470 and the process of determining whether the selected storage pool is approved is repeated.

In some embodiments, determining the status of each storage pool may be accomplished by first passing a list of storage pool IDs having a nonzero allocationRequirement to a thin provisioning consult module. The thin provisioning consult module may create two initially empty lists: an OKStoragePoolList and a PendingStoragePoolList. The thin provisioning consult module may also determine the minimum WAN speed (SpeedX) between the cache site and the home site. For each storage pool in the list of storage pool IDs, a time interval T may be determined representing how long it will take to transfer the files identified in the information table associated with the selected storage pool. For example, the time interval may be represented by T=PoolDataTransferSize/SpeedX=(allocationRequirement+existingSize)/SpeedX. Using out of band protocol, the thin provisioned device may be asked whether it can accommodate the requested file transfer within the time interval T. Depending on whether the thin provisioned device returns YES or NO, the selected storage pool is added to either the OKStoragePoolList or the PendingStoragePoolList.

In some embodiments, in determining whether the selected storage pool is approved, the thin provisioned device may return YES if ((UCap+newAlloc+T*AppAllocORate)<(R %*ACap)), and otherwise return NO; where ACap=actual physical capacity, UCap=used physical capacity, AppAllocIORate=local application allocation IO rate, T=time interval for resync writes on the selected pool, newAlloc=new allocation during resync writes, and R %= Repository Capacity Threshold.

After all storage pools associated with files listed in the information table have been identified as approved or pending, the home site may prepare a reply at 475 to send to the cache site at 480. The reply may contain a list of the files identified in the information table that are approved for immediate transfer from the cache site to the home site. In some embodiments, the home site may consult a list of file identifiers received in the information table, determine the storage pool associated with each file identifier, consult a list of approved storage pools, and prepare a list of file identifiers whose associated storage pool was approved. This list may then be sent to the cache site. For all unapproved storage pools, an administrator may be notified that additional physical storage is needed along with the allocation sizes determined for these unapproved storage pools.

At 485, if there are files identified in the information table that have not yet been approved for transfer, the home site waits for a previously pending storage pool to be approved at 490. For example, an administrator may have allocated additional physical storage for the storage pool or may have relocated data from the storage pool to another pool. When a previously pending storage pool is approved at 490, the home site prepares a subsequent reply at 475 to send to the cache site at 480. The reply may contain a list of the files identified in the information table that are now approved for transfer from the cache site to the home site. When all filed identified in the information table have been approved for transfer from the cache site at 485 and all files have been transferred, the method ends at 495.

Figure 5:
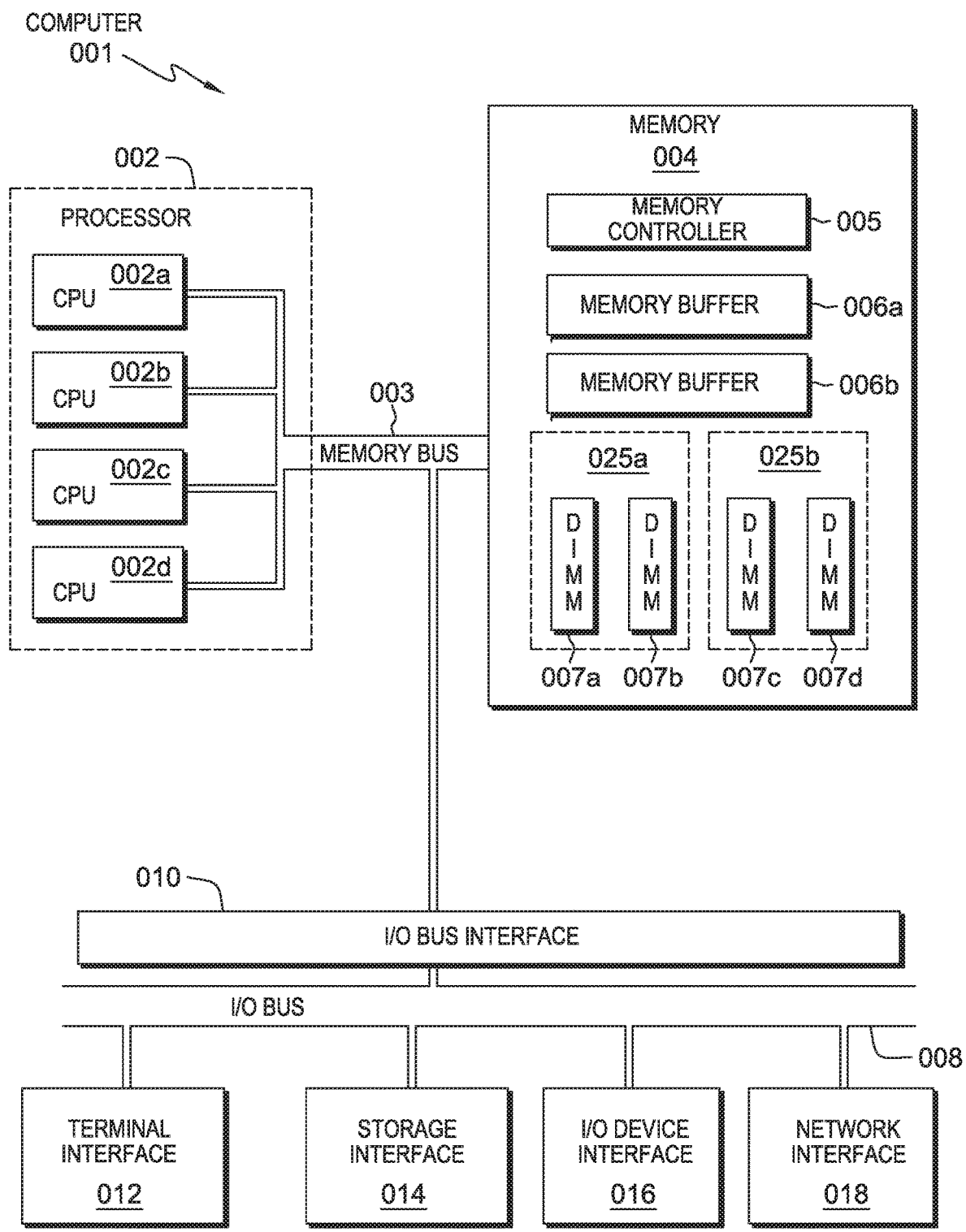
FIG. 5 is a high-level block diagram illustrating an example system for implementing one or more embodiments of the invention.

FIG. 5 depicts a high-level block diagram of an example system for implementing portions of one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. The use of DRAMs is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 5 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an exemplary computer system 001. But individual components may have greater complexity than represented in FIG. 5, components other than or in addition to those shown in FIG. 5 may be present, and the number, type, and configuration of such components may vary.

Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

Portions of one or more embodiments of the invention may be implemented in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing files in a computing environment, the computing environment including a home site and a cache site, the method comprising:
   receiving, at the home site, an information table having an entry for each of a plurality of updated files, wherein each of the plurality of updated files has a post-update file size and a pre-update file size, the plurality of updated files including a first set of updated files associated with a first storage pool;
   adjusting a storage pool allocation size for the first storage pool based on the post-update file size of each file in the first set of updated files associated with the first storage pool;
   determining, based on the storage pool allocation size, a time interval representing how long it will take to transfer the first set of updated files to the first storage pool;
   comparing the time interval to a threshold time value;
   determining, based on the time interval satisfying the threshold time value, that the first storage pool can accommodate transfer of the first set of updated files; and
   sending, to the cache site, a reply identifying at least one approved file and at least one disapproved file from the plurality of updated files.

2. The method of claim 1, further comprising:
   receiving first resynchronization data associated with the at least one approved file transferred from the cache site in response to the reply;
   wherein transfer of second resynchronization data associated with the at least one disapproved file to the home site is delayed in response to the reply.

3. The method of claim 2, further comprising:
   sending, to the cache site, at least one subsequent reply approving transfer of the at least one disapproved file; and
   receiving the second resynchronization data in response to the at least one subsequent reply.

4. The method of claim 1, wherein the reply includes a file identifier for each of the at least one approved file.

5. The method of claim 1, wherein the cache site and the home site communicate over a wide area network as part of a storage system within a cloud computing environment; wherein the method further comprises determining to perform a resynchronization in response to a failure of the wide area network.

6. The method of claim 1, wherein the home site has a first at least one thin-provisioned storage device and the cache site has a second at least one thin-provisioned storage device, and wherein the second at least one thin-provisioned storage device raises a capacity threshold warning during updating of the plurality of updated files.

7. The method of claim 1, wherein the home site has a first thin-provisioned storage device and a second thin-provisioned storage device, wherein the first thin-provisioned storage device has a repository capacity threshold specifying a minimum percentage of available physical capacity, the method further comprising:
   determining that available space on the first thin-provisioned storage device drops below the repository capacity threshold;
   allocating additional physical storage to the first thin-provisioned storage device; and
   relocating data from the first thin-provisioned storage device to the second thin-provisioned storage device to free up physical storage on the first thin-provisioned storage device, the second thin-provisioned storage device being located within the home site.

8. A computer program product for managing files in a computing environment, the computing environment including a home site and a cache site, the computer program product comprising a computer readable storage medium having program instructions embodied therewith, the program instructions executable by a processor to perform a method comprising:
   receiving, at the home site, an information table having an entry for each of a plurality of updated files, wherein each of the plurality of updated files has a post-update file size and a pre-update file size, the plurality of updated files including a first set of updated files associated with a first storage pool;
   adjusting a storage pool allocation size for the first storage pool based on the post-update file size of each file in the first set of updated files associated with the first storage pool;
   determining, based on adjustments to the storage pool allocation size, a time interval representing how long it will take to transfer the first set of updated files to the first storage pool;
   comparing the time interval to a threshold time value;
   determining, based on the time interval satisfying the threshold time value, that the first storage pool can accommodate transfer of the first set of updated files; and
   sending, to the cache site, a reply identifying at least one approved file and at least one disapproved file from the plurality of updated files.

9. The computer program product of claim 8, wherein the program instructions are further configured to cause the processor to:
   receive first resynchronization data associated with the at least one approved file transferred from the cache site in response to the reply;
   wherein transfer of second resynchronization data associated with the at least one disapproved file to the home site is delayed in response to the reply.

10. The computer program product of claim 9, wherein the program instructions are further configured to cause the processor to:
    send, to the cache site, at least one subsequent reply approving transfer of the at least one disapproved file; and
    receive the second resynchronization data in response to the at least one subsequent reply.

11. The computer program product of claim 8, wherein the reply includes a file identifier for each of the at least one approved file.

12. The computer program product of claim 8, wherein the program instructions are further configured to cause the processor at the home site to communicate with the cache site over a wide area network as part of a storage system within a cloud computing environment; wherein the program instructions are further configured to cause the processor to perform a resynchronization in response to a failure of the wide area network.

13. The computer program product of claim 8, wherein the home site has a first thin-provisioned storage device and a second thin-provisioned storage device, wherein the first thin-provisioned storage device has a repository capacity threshold specifying a minimum percentage of available physical capacity, the program instructions further configured to cause the processor to:

determine that available space on the first thin-provisioned storage device drops below the repository capacity threshold;

allocate additional physical storage to the first thin-provisioned storage device; and relocate data from the first thin-provisioned storage device to the second thin-provisioned storage device to free up physical storage on the first thin-provisioned storage device, the second thin-provisioned storage device being located within the home site.

14. A computer system for managing files in a computing environment, the computing environment including a home site and a cache site, the computer system comprising:

a memory; and a processor in communication with the memory, wherein the processor is configured to:

receive an information table having an entry for each of a plurality of updated files, wherein each of the plurality of updated files has a post-update file size and a pre-update file size, the plurality of updated files including a first set of updated files associated with a first storage pool;

adjust a storage pool allocation size for the first storage pool based on the post-update file size of each file in the first set of updated files associated with the first storage pool;

determine, based on the storage pool allocation size, a time interval representing how long it will take to transfer the first set of updated files to the first storage pool;

compare the time interval to a threshold time value;

determine, based on the time interval satisfying the threshold time value, that the first storage pool can accommodate transfer of the first set of updated files; and send a reply identifying at least one approved file and at least one disapproved file from the plurality of updated files.

15. The computer system of claim 14, wherein the processor is further configured to:

receive first resynchronization data associated with the at least one approved file transferred from the cache site in response to the reply;

wherein transfer of second resynchronization data associated with the at least one disapproved file to the home site is delayed in response to the reply.

16. The computer system of claim 15, wherein the processor is further configured to:

send at least one subsequent reply approving transfer of the at least one disapproved file; and receive the second resynchronization data in response to the at least one subsequent reply.

17. The computer system of claim 14, wherein the reply includes a file identifier for each of the at least one approved file.

18. The computer system of claim 14, wherein the processor is further configured to direct communication between the home site and the cache site over a wide area network as part of a storage system within a cloud computing environment; wherein the processor is further configured to perform a resynchronization in response to a failure of the wide area network.

19. The computer system of claim 14, wherein the home site has a first thin-provisioned storage device and a second thin-provisioned storage device, wherein the first thin-provisioned storage device has a repository capacity threshold specifying a minimum percentage of available physical capacity, the processor further configured to:

determine that available space on the first thin-provisioned storage device drops below the repository capacity threshold;

allocate additional physical storage to the first thin-provisioned storage device; and relocate data from the first thin-provisioned storage device to the second thin-provisioned storage device to free up physical storage on the first thin-provisioned storage device, the second thin-provisioned storage device being located within the home site.

20. The computer system of claim 14, wherein the home site has a first at least one thin-provisioned storage device and the cache site has a second at least one thin-provisioned storage device, and wherein the second at least one thin-provisioned storage device raises a capacity threshold warning during updating of the plurality of updated files.

\* \* \* \* \*